UNITED STATES PATENT OFFICE.

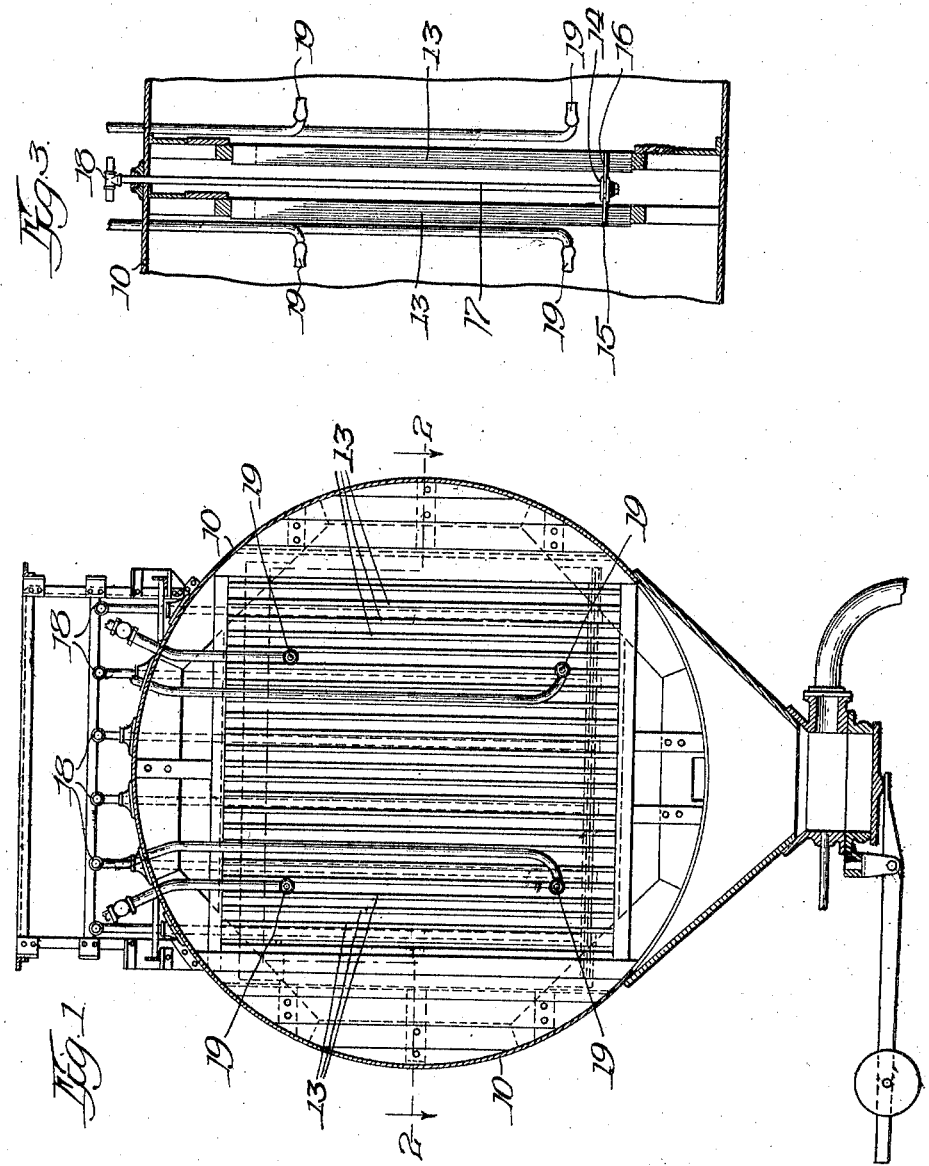

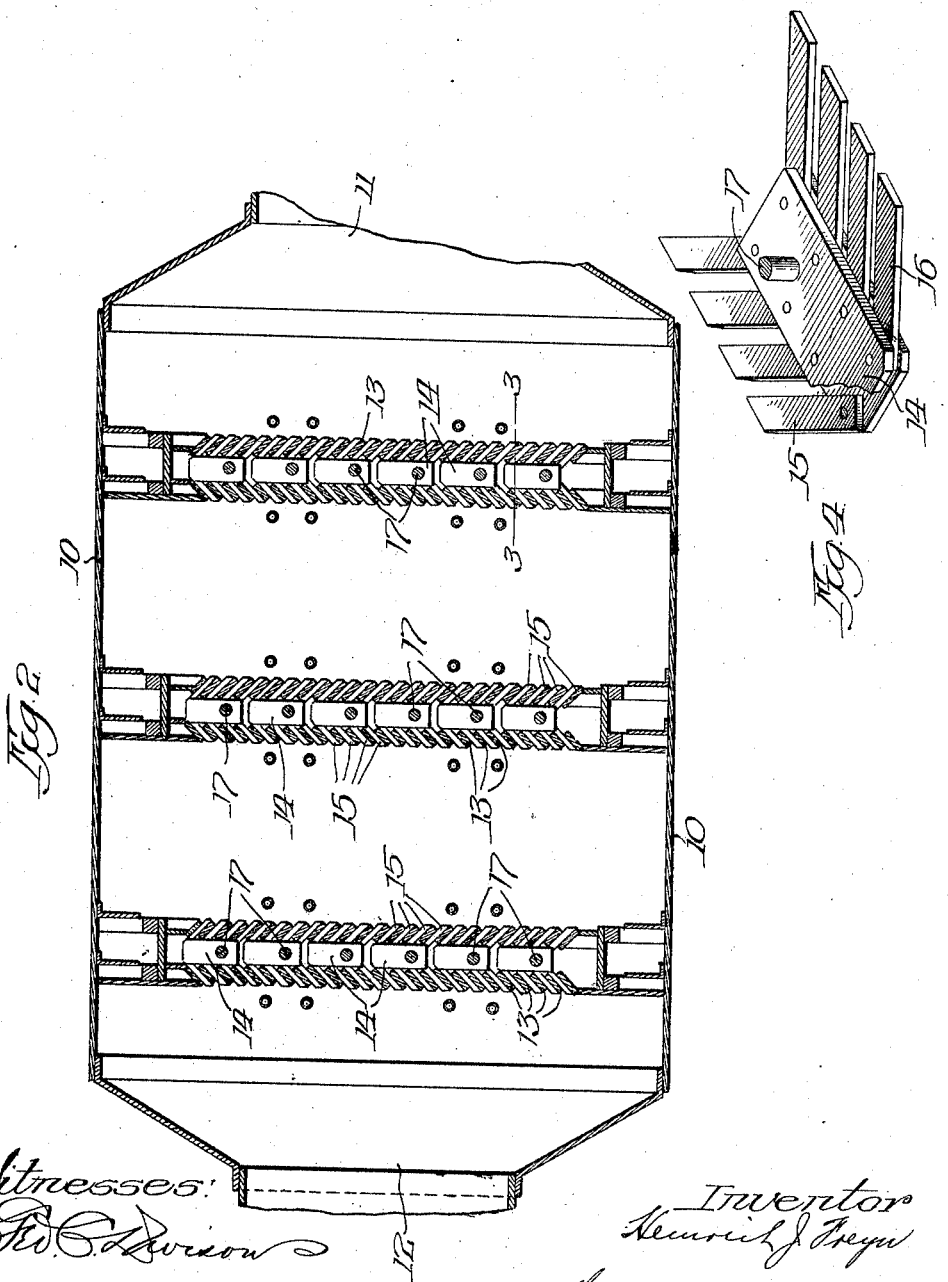

HEINRICH J. FREYN, OF CHICAGO, ILLINOIS, ASSIGNOR, BY MESNE ASSIGNMENTS, TO FREYN AND COMPANY, OF CHICAGO, ILLINOIS, A CORPORATION OF MAINE.

GAS-CLEANING APPARATUS.

1,316,091.      Specification of Letters Patent.      Patented Sept. 16, 1919.

Application filed February 19, 1917. Serial No. 149,448.

*To all whom it may concern:*

Be it known that I, HEINRICH J. FREYN, a citizen of the United States, and resident of Chicago, in the county of Cook and State of Illinois, having invented certain new and useful Improvements in a Gas-Cleaning Apparatus, of which the following is a specification.

My invention relates generally to devices for removing suspended solids from moving bodies of gases, and specifically to means associated with a gas drier for mechanically scraping certain surfaces interposed in the line of flow of the gas to remove accumulated matter.

While my improvement is applicable to many different forms of gas cleaning apparatus, it is here illustrated in connection with a gas drier, such as is shown in the patent to H. A. Brassert #1,169,919 of Feb. 1st, 1916.

It has been found in the use of apparatus such as disclosed in the patent referred to that while the apparatus acts primarily as a drier by intercepting and causing the deposition of small bodies of water carried in suspension in the gases, the fine particles of dust and solid matter which have not been removed in the preceding cleaning operation, will likewise deposit upon the baffles. The device in effect acts to finally clean the gas before it is delivered for use. While this result is desirable, I have found that means must be provided for dislodging the accumulations, the mere spraying of the baffles having been found to be ineffective under certain circumstances. The solid matter has a tendency to form an incrustation, which can only be removed by scraping the baffles or slats.

To this end I have provided means which may be manually operated from a point outside of the drier, whereby the baffles may be scraped at intervals without interrupting the operation of the device.

The invention will be more readily understood by reference to the accompanying drawings in which:

Figure 1 is a transverse section through a gas drier to which my improvement has been applied.

Fig. 2 is a horizontal sectional view through the device, the view being taken on the line 2—2 of Fig. 1.

Fig. 3 is an elevation partly in section, the view being taken on the line 3—3 of Fig. 2 and, Fig. 4 is an enlarged fragmentary perspective view of one of the scrapers.

Referring more particularly to the drawings it will be seen that the device is inclosed within a casing 10, having an inlet 11, and an outlet 12. Vertically disposed within the casing are a plurality of baffles or slats 13 positioned at an angle to the direction of flow of the gas and arranged in rows with uniform spaces between them and with the rows preferably related in pairs, so that in each pair of rows there is an inter-row space communicating with a plurality of inter-slat spaces extending at an angle to the inter-row space; the slats in one row being preferably arranged at an angle to those of the other row, for instance, an angle of about 90°. The effectiveness of the drier so constructed follows from the fact that the particles of moisture carried by the gas are caused to impinge upon the angularly disposed surfaces and to trickle down the baffles immediately leaving the path of the gas. As stated, however, many particles of solid matter also adhere to the baffles and to assist in removing such accumulations, I provide a plurality of scrapers, consisting of a central plate 14, located in the inter-row space and guided by the opposed edges of the slats; said plate having a plurality of laterally projecting arms 15, 16 extending at such angles thereto as to enter the angularly-disposed inter-slat spaces; each plate 14 being preferably provided with arms projecting on both sides so that the plate is balanced in the resistance which it encounters. When used as shown in Fig. 2, the arms will project at right angles to each other. Each arm or projection is shaped to fit loosely between two of the baffles or deflectors, both marginal edges of the projection being active to remove solids. Thus the mere act of reciprocating the scraper under the action of the stem 17, will cause the removal of the solids. A number of these scrapers is provided sufficient to scrape both surfaces of each of the vertical slats. The operating stems 17, project through the casing and terminate in T's 18, as best shown in Fig. 3, which may be manually grasped by workmen in order to vertically reciprocate the scrapers. The usual spray nozzles 19, are shown, which may be used in connection with or independently of the scrapers as desired.

While I have not so shown, the scrapers may, if desired, be connected by suitable means at a point exterior of the casing and all operated simultaneously by manual or power means. This and other modifications are considered within the scope of my invention, and I do not wish to be limited, except as indicated in the appended claims.

I claim:

1. In a gas-cleaning device, the combination of a plurality of slats spaced in a row, a plate lying across and guided by the edges of said slats and adapted to reciprocate in the direction of the length of the slats, and arms carried by said plate projecting into and fitting the inter-slat spaces and thereby held in contact with the opposed faces of the slats in the row.

2. In a gas-cleaning device, the combination of a plurality of spaced slats arranged in rows with two rows related as a pair, a plate located in the inter-row space guided by opposed edges of slats and adapted to reciprocate longitudinally of the slats, and arms projecting from opposite sides of said plate and entering and fitting the spaces between the slats in the respective rows.

3. In a device of the class described, the combination of a casing, a plurality of spaced parallel slats therein, said slats being angularly disposed with relation to the flow of gas, a scraper fitted between two adjacent rows and having at its side edges arms adapted to enter and fit between the slats of the respective rows, and a rod connected to the scraper and projecting outside of the casing, said rod and scraper being adapted for reciprocation to remove deposits from said slats, substantially as described.

4. In a device of the class described, the combination of a plurality of spaced slats arranged in a row, a plurality of scraper arms entering the spaces between the slats in the row and adapted to contact with opposed faces of said slats, and means guided by the edges of the slats and uniting said scraper arms in a group and moving them longitudinally of the slats.

5. In a device of the class described, the combination of a casing, a plurality of rows of baffles therein, the baffles of each row being disposed at an angle to the baffles of an adjacent row, a scraper confined between and guided by the edges of adjacent rows and having a portion fitting between two baffles in each row, and means for reciprocating said scraper in line with said baffles, substantially as described.

6. In a gas drier, the combination of a horizontal casing, a plurality of rows of vertical wooden baffles therein, the baffles of each row being disposed at an angle to those in an adjacent row, and a mechanical scraper guided between the opposed edges of the rows having an actuating rod projecting vertically outside of said casing, said scraper having a plurality of scraper-arms fitted between adjacent baffles and adapted upon reciprocation of said scraper to remove deposits from a plurality of baffles, substantially as described.

7. In a gas drier, the combination of a series of slats arranged in a row with spaces between them, and a series of scraper arms entering the spaces between the slats in said row; said scraper arms extending outside said spaces and having means lying across their extending ends and connecting them in groups, whereby a plurality of said arms may be moved through a single instrumentality.

Signed at Chicago, Illinois, this fifteenth day of February, 1917.

HEINRICH J. FREYN.

Witnesses:
 HENRY M. HUXLEY,
 C. F. MURRAY.

Copies of this patent may be obtained for five cents each, by addressing the "Commissioner of Patents, Washington, D. C."